Patented June 14, 1927.

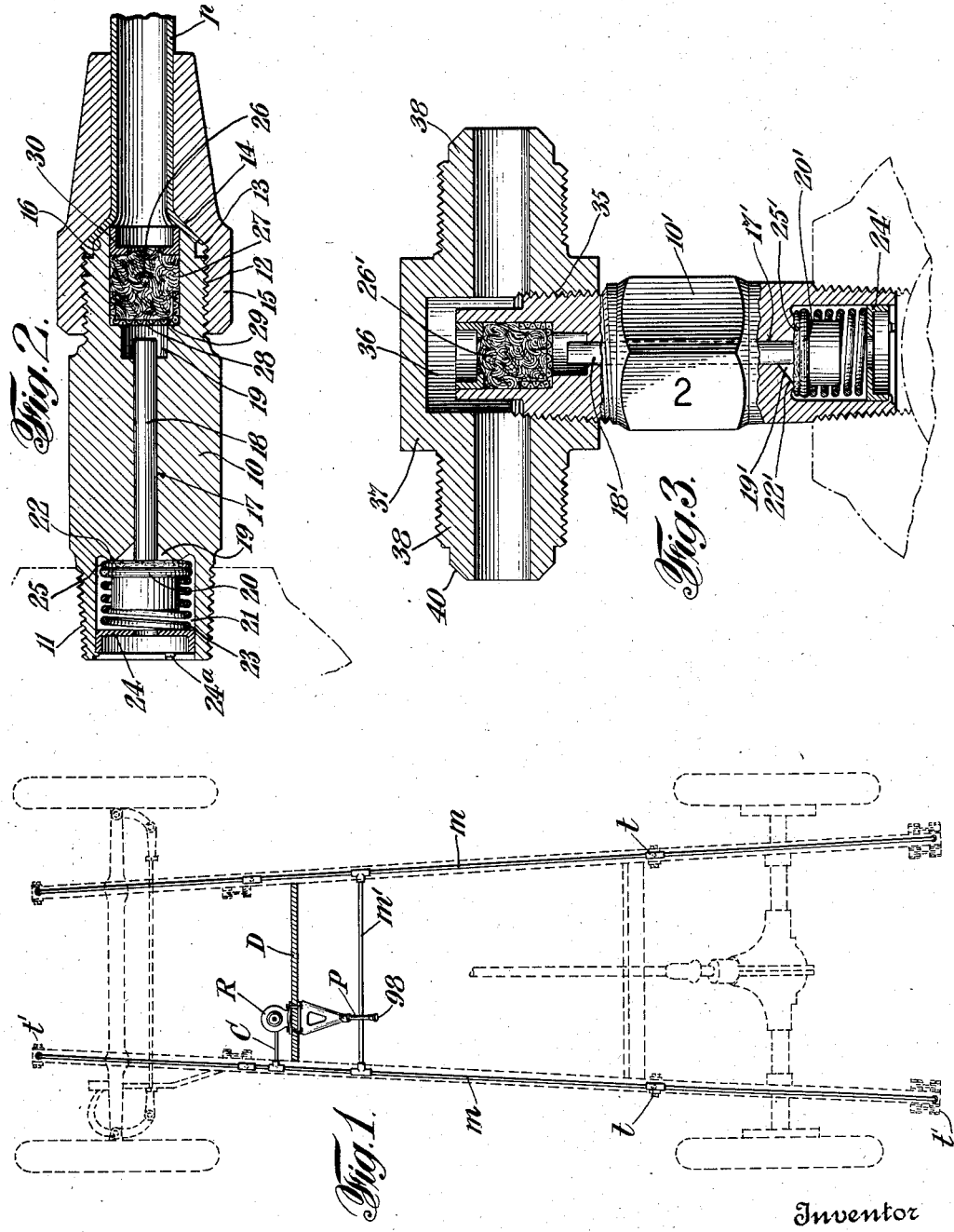

1,632,772

UNITED STATES PATENT OFFICE.

JOSEPH BIJUR, OF NEW YORK, N. Y., ASSIGNOR TO AUTO RESEARCH CORPORATION, A CORPORATION OF DELAWARE.

FLOW-CONTROL FITTING.

Application filed July 31, 1926. Serial No. 126,115.

My present invention relates primarily to lubrication and is more especially concerned with the control devices that determine the flow through any or all of the outlet branches of a pressure operated central lubricating installation; although the invention in its broader aspects has application to the distribution and flow control of other fluids.

The invention is illustrated in an embodiment of flow control fitting of a type designated as a "drip plug" and defined as a small volume pipe fitting that emits continuously throughout application of a propelling pressure applied thereto through intervening supply piping.

It is an object of the invention to provide fittings of the type referred to, which when used as the outlets of a system, supplying a plurality of bearings concurrently, from a common source of pressure, shall assure without the need for cleaning or for adjusting or air-bleeding manipulation, either initially or after service, and substantially regardless of the conditions of use thereof, that each bearing receives an accurately predetermined proportion of the total charge corresponding to the requirements thereof.

Another object is to provide drip plugs of the type referred to, which will respond reliably to pressure transmitted from a remote source, though intervening piping of very small bore be used, to initiate feed to the bearings promptly and to sustain such feed at the relative rate predetermined by each fitting, without the need for allowing for differences in the lengths of pipe branches or for diversities in level or in the tightness or looseness of the bearings.

Another object is to provide drip plugs of character such that they will control the proper distribution of oil to various bearings regardless whether the oil be relatively fluid at high temperature or relatively viscous at low temperature, thereby rendering feasible the use of one and the same grade of viscous oil under all ranges of temperatures between winter and summer.

Another object is to provide drip plugs of the character referred to, which regardless of the number thereof supplied from a common source, will promptly respond to work performed by a small manual effort and will cease feeding as soon as the pressure at the source is discontinued or spent.

Another object is to provide a drip plug of the type mentioned having a rugged construction devoid of moving mechanism and easily produced by automatic machinery at small cost.

Another object is to provide a fitting of the character referred to, which may be installed as a completely pre-assembled unit, that both in the handling before installation and in its operation or use, is substantially proof against injury of its internal parts and against clogging or other derangement by the entry of dirt or other particles thereinto.

Another object is to provide a drip plug device uniformly compact in construction, substantially regardless of the rating thereof, which rating is accurately predetermined by the dimensions of one of the constituent metallic elements thereof, without the need for any special sight-feed or other inspection parts, or for adjusting appurtenances or operations.

Another object is to provide a fitting of the type mentioned, which lends itself readily to application directly at a bearing, and which affords a closed course, liquid and dust-tight for flow of oil to the bearings, and which will neither pass to the bearing, nor become deranged by solid particles that may be entrained with the oil in its flow through the piping.

Another object is to provide a relief or non-return valve seated by a relatively weak spring without the need, in order to assure an oil-tight seal thereof, to render the valve irregular or sluggish in action by the use of a seating surface of adhesive or sticky character, or to make the valve of area larger than can be readily seated within a small pipe fitting.

According to my invention, each drip plug constitutes a unitary pipe fitting which has in the interior thereof, a considerable flow resistance, preferably a substantially invariant and invariable one, accurately predetermined in accordance with the rate of flow and conditions of operation desired. Such high resistance when confined within the volume and short length available in the small pipe fitting, may be subject to derangement by the lodging of minute solid particles thereat. Chips introduced into the feed pipe in making the same up, scale cracked from the inner wall of the piping, and particles of dirt originally in the pipe, are likely to be entrained by the oil and carried to and intercepted by the resistances, regardless of the precaution of introducing only clean oil into the inlet of the pipe system from which the drip plugs emit.

By my invention, I provide at the inlet end of each fitting a strainer of texture so dense as to intercept such solid particles and keep them from the resistances. The strainer is preferably a porous absorbent mass capable of maintaining oil in its interstices by capillarity. Where a fibrous strainer material is used, such as wool felt, there is the possibility of loose hairs thereof being entrained with the oil and lodging at the resistance. This is guarded against by providing such strainer plug with a close mesh metal backing screen.

Drip plugs embodying only a flow resistance with the protective strainer, may be satisfactory for use in factory installations, in which a sustained supply of lubricant to the bearings is desired throughout continuous operation. In chassis lubricating installations, however, and in analogous relations, where a small charge, less than that filling the piping system, is to be fed only from time to time to bearings at different levels, means should be provided to prevent the pipe line from becoming wholly or partly drained in the intervals between lubricant feed. In chassis lubrication, for instance, air might enter the high side of a pipe line and oil run out of the low side, while the vehicle is left standing on an incline. To preclude such draining, I provide sealing means preferably a relief valve in each of the various drip plugs, said sealing means normally closed to prevent the reverse flow or entry of air or the escape of lubricant, but permitting emission when a predetermined pressure is exceeded.

The elements of the relief valve should be so perfectly true that when pressed closed under the pressure of a light spring, the valve is oil-tight under a sustained gravity head, in the order of two feet, occurring in a motor vehicle. The valve surface should, moreover, be nonsticking in character; otherwise sluggishness and irregularities will occur in the opening of various valves. A facing for a flat or disk valve found to answer the purpose completely is of woven, knitted, netted or matted fabric, impregnated with varnish or oil. Preferably I employ so-called oil-silk or varnished silk, which is an article of commerce, and which is suitable and voids stickiness when baked to dryness. This material has sufficient softness to yield and take the impress of the hard valve seat annulus and is, accordingly, self-aligning thereat and is also chemically inert to oil.

In my arrangement, it will be seen that the strainer plug protects not only the resistance, but also the valve which requires protection, for, a solid particle becoming lodged at a valve seat, would cock the valve and thereby permit draining of lubricant.

The strainer plug imposes a substantial resistance to flow, which varies for plugs produced under the same conditions, and further changes occur after interception of particles thereat. The valve springs also vary in their strengths due to manufacturing tolerances. Bearings in practice are not uniformly tight. These variations of the resistance to flow imposed by the strainers, the valves and the bearings are, however, rendered unimportant by the use of a control resistance high compared to that imposed at the strainer and at the valve of the drip plug, combined with that due to the bearings supplied therefrom. The control resistance is of character such as to be easily produced to a high degree of accuracy, so that the rating of the drip plug will depend solely on which of a variety of control resistances is employed therein.

The drip plug having a predetermined rating, the constancy of which is preserved by the presence of the protective strainer, the flow control resistance can be and preferably is inaccessible from the exterior of the completed drip plug, no adjusting or regulating device or aperture being provided therefor.

While my control resistance could be of any of a wide variety of possible constructions, I prefer one affording a minute, but continually open passage and preferably a relatively long passage, the wall or walls of which are of rigid solid metal parts. In one desirable embodiment, the control resistance comprises a longitudinal bore through the fitting nearly filled with a metering pin, affording but a minute high resistance clearance extending generally lengthwise of the drip plug. In a preferred embodiment, the pin may have a smooth cylindrical surface fitting loosely in place within the bore and extending at its ends into enlargements of the bore. The pin may be sustained against displacement or loss from the fitting by the relief valve at the outlet end and the strainer plug at the inlet end thereof.

The metering pin in each drip plug determines a crevice so minute as to be in itself largely controlling of the resistance to flow imposed by the drip plug. The rating of any drip plug thus depends merely on the diameter of metering pin employed, using uniform bores, the smaller the pin, the faster the rate, but the pin of even the fastest flowing drip plug determines a resistance to flow high relative to that of the strainer felt, of the valve and of the bearings.

The pipe fitting of my drip plug is nearly filled by the resistance, the valve and the strainer making up the operative parts of the drip plug, and these parts require for their operation, no large cavities or pockets in which air might be trapped and impair the reliability of operation. Such cavities as are present in the drip plug are so small in cross-section at all parts of the length thereof, and so directly in the path of lubricant flow, that any air will automatically be expelled as lubricant is forced into the fitting.

The drip plug fitting may be applied directly at the bearing and have means for securing at the inlet end thereof, the supply pipe therefor. In the embodiment shown, the drip plug is directly screwed into the fixed bearing member and by means of an appropriate coupling, the pipe terminal is affixed upon the inlet end of the drip plug. In the case of bearings in the run rather than at the extremities of the pipe line, the drip plugs are provided with T heads, to the opposite ends of which segments of the feed pipe are connected.

The present application is a continuation in part of my copending application, Serial No. 580,668 filed August 9th, 1922, and Serial No. 695,740 filed February 28th, 1924.

The T-fitting construction shown in Fig. 3 is not specifically claimed herein, but claims to this element are included in my copending application Serial No. 191,280 filed May 14, 1927, which is a continuation in part of the present case.

In the accompanying drawings in which are shown one or more embodiments of the various features of my invention, Fig. 1 is a diagrammatic plan view of an automobile equipped with my installation, Fig. 2 is an enlarged view in longitudinal cross-section of a drip plug, and;

Fig. 3 is a view similar to Fig. 2 of the T drip plug, part being shown in elevation.

In Fig. 1 is shown diagrammatically the chassis of an automobile equipped with a lubricant supply unit, illustratively on the dashboard D and comprising an oil reservoir R with an associated pump P, to the outlet of which is connected pipe $c$, which leads to one of two mains $m$ extending the length of the channel frames and in communication with each other through a cross-pipe $m'$. Branches or taps $t$ a few only of which are indicated, lead from the mains to the various chassis bearings to be lubricated, such as the spring shackles and bolts, steering gear and other bearings. The outlet of each branch and the ends of the mains are provided with or constitute terminals applied in general each directly to the non-turning element of the bearing to be supplied therefrom. Pipes or conduits of suitable flexibility (not shown) may be employed to bridge from the mains, or from one of the mains, to mains on one or both of the axles and/or other parts that perform relatively large movements with respect to the frame in use of the vehicle such as for instance the steering knuckles and the brake rigging. The construction, arrangement and mounting of the pipes, bores or other lubricant-conveying conduits on the vehicle or on the lubricated elements of the vehicle, are not in themselves part of the invention claimed herein and are, accordingly, not further described.

The outlet terminals $t'$ at the ends of the mains and those controlling the delivery to the bearings supplied from the ends of the flexible branches or taps (not shown) are each preferably drip plugs of the construction shown in Fig. 2. At some places, the drip plugs are embodied in the T fittings shown in Fig. 3. These fittings may be used, for instance, in the run of mains on the frame or on the axles (not shown), the stems of said fittings constituting taps or branches, applied at bearings, such as the rear shackles of the front springs. The entire length of piping from the pump to each of the drip plugs is preferably of rigid small diameter seamless piping which is substantially non-dilatable under the operating pressures employed.

In the present application, I claim the drip plug per se, which while of high utility in an installation such as that suggested in Fig. 1, and more fully described in my copending application, Serial No. 124,566 filed July 24th, 1926 is useful in other relations as previously indicated.

The reservoir and pump assembly diagrammatically shown in Fig. 1 is fully described and claimed in my copending application, Serial No. 131,640 filed August 26th, 1926, and in the divisions thereof, Serial No. 182,362, filed April 9th, 1927, and Serial No. 193,090 filed May 21, 1927, and is but one of numerous possible sources of liquid and of pressure for a system emitting through my drip plugs.

I have shown and will describe in detail but one of a wide variety of possible embodiments of the invention embraced within the scope of the appended claims.

The terminal or drip plug construction shown in Fig. 2 comprises a machined pipe fitting or bored rod 10 having a pipe thread 11 at one end for application at a bearing or other support structure in communication with a bearing. At the opposite end, the fitting has a cylindrical thread 12 for application thereto, by means of an appropriate coupling, of the extremity of the feed pipe $p$. I have illustratively shown a flare coupling pipe connection, the previously flared end 13 of the pipe being pressed by the inclined shoulder 14 of a coupling nut 15, screwed upon the thread 12, against the correspondingly tapered end 16 of the fitting 10. The nut is elongated as shown and thereby precludes any sharp bend in the pipe too close to the flare end.

The drip plug is provided with a longitudinal bore 17 of accurately predetermined diameter nearly filled by a length of pin or wire 18 also of accurately predetermined diameter, thereby forming a highly restricted annular crevice of substantial length. As shown, the bore is enlarged at its opposite ends at 19 and the ends of the pin extend into said enlargements so that the flow restricting crevice is of accurate predetermined uniform cross-section from end to end.

At the inlet of the fitting, I provide a strainer of absorbent or porous, more specifically of matted fibrous material. Preferably this strainer is a wad or plug 26 of wool felt lodged in a socket 27 in advance of the restriction pin 18 and serving to intercept any solid particles that might otherwise be carried by the oil to the restriction passage or relief valve. The felt plug is so small in diameter as to be readily accommodated within the small fitting without any special enlargement therefor. It has substantial thickness as compared to a woven screen, so that solid particles that may pass the surface of the felt are intercepted within the body thereof. The effective straining area of the felt is thus many times that of its end surface. A woven screen, if of sufficiently fine mesh to be effective, might soon clog, unless made of such large area as to necessitate an increase in the size of the fitting. The felt is backed by a cup 28 of fine metal mesh forced thereover and serving to prevent any loose fibres of the felt from passing to the valve seat 22 and also to prevent the wad from being forced beyond the shoulder 29 against which the cup 28 seats. The felt is held in place within the cartridge by a press-fitted centrally perforated cup 30 at the inlet end thereof. This cup is not jammed tight against the strainer felt, whereby the entire end surface of the felt remains in the path of flow, notwithstanding the presence of cup 30.

The relief valve comprises a metal disk or button 20 in a corresponding cavity 21 at the outlet end of the fitting, held against a convex annular valve seat 22 in the fitting by a coil spring 23 reacting against a perforated cup 24 pressed into the cavity 21, and secured in place by staking at 24ᵃ. For reasons previously stated, the seating surface of the valve is provided with a facing 25, smooth to seat completely under the light pressure of spring 23, substantially impervious, chemically inert to oil and non-sticking, which properties are possessed by well baked oil-silk or varnished silk. In chassis lubricating applications, I employ relatively weak valve springs 23, say of not more than fifteen pounds seating pressure.

The valve facing material used by me is apt to contain in its surface minute bubbles of air or specks of dust, which would prevent perfect seating and permit leak. To test the facings, I apply air pressure slightly less than the oil pressure to which the valve is to respond. If the valve sustains such air pressure, it is satisfactory; if it allows air to escape, the facing disk is defective and is replaced. The air test is more severe than an oil pressure test, can be quickly performed and leaves the drip plug dry and clean. These tests are made with the valve alone in the drip plug fitting piece before assembly of the restriction pin or the strainer plug therein. Since the metering pin and its bore are accurately predetermined in dimensions, which alone determine the rate of flow, no operating or flow test is required for the restriction. Commercial variations in the strainer felt of a given weight have no material effect on the flow. Accordingly, after the valve has passed inspection, the restriction pin and strainer need merely be applied and the completed drip plug is now known to be satisfactory without the need for further test.

In the construction shown, the restriction pin 18 requires no separate support, being maintained in position within the bore by the relief valve 20 at one end and the strainer plug 26—28 at the other. The cross-sectional area of the annular crevice 17—18 though minute, can be made uniform within very fine limits, since it is the difference between the cross-sections of a short bore and a wire filler, both of appreciable dimensions and both of which can be easily formed accurately by automatic machinery.

The drip plug can be easily handled, before installation, since it presents no exposed vulnerable parts. The valve in its protected location at one end of the fitting and the strainer at the other, exclude foreign particles from the resistance therebetween, so that the rating of the latter will not be impaired by the entry of dirt.

The strainer plug and the valve facing though of non-mineral character, will not be injured by the heat in the chamber through which the completed chassis is conveyed in mass production, for the purpose of hardening or drying a coating of japan or varnish sprayed thereon.

The restriction pin 18 determines a fixed invarient passage, which neither requires nor permits of adjustment. For a given propelling pressure upon oil of a given viscosity, the drip plug will thus emit accurately at a constant rate. In a preferred embodiment, the effective length of bore 17 is about $\tfrac{7}{8}$ inch and its diameter .063 inch. The restriction pin may have a diameter of .061 inch. Under an oil pressure of about 50 pounds per square inch, exerted on medium heavy motor oil at a temperature of about 70 degrees F., a drip plug of the specifications set forth will emit by dripping at a rate of about .10 c. c. per minute. By the substitution of a restriction pin .060 inches in diameter, that is, only .001 inch less in diameter, the rate of emission is approximately doubled. With the use of a pin of .059 inches in diameter, that is, .002 inches less, the rate is approximately trebled. With a pin of .057 inches in diameter, the rate is found to be about 1 c. c. per minute. The dimensions specified of the bore and of the pins are with tolerances of two ten thousandths of an inch (±.0002) greater or less. Thus, the rating or calibration of the drip plug is determined solely by the gauge of restriction pin employed, the other parts of the drip plug remaining the same and under the substantial operating pressure, the drip plugs thus emit by seepage rather than by free flow. In practical use, the drip plugs are pre-assembled, and each bears a rating mark, illustratively shown in Fig. 3 as a numeral on one face of the hexagon-stock fitting. A drip plug with a .061 pin, for instance, would be designated by numeral 1 and called a No. 1 plug, one with the .060 pin by numeral 2 and called a No. 2 plug, etc., each drip plug bearing the numeral designating its rating. Operating under the conditions described it is preferred not to exceed a difference of diameter of .007" between pins and bores of the dimensions specified, and in general to provide a difference of diameter of not less than .001".

For bearings, such as the brake cross shaft bearings which require but little oil, No. 1 drip plugs, that is, plugs of the slowest rating would be employed; the hinge eye bolts of the springs which require more oil would each be supplied from a No. 2 drip plug, the spring shackles each of which has two bearing bolts would be equipped with a No. 3 or 4 drip plug, and the steering knuckles, which require still more oil would be equipped with drip plugs of still faster rating.

All of the drip plugs, five, ten, twenty or more in number, offer a flow resistance when thus connected in parallel, substantially in excess of that incurred in the entire length of piping leading thereto from the common pressure source, or inlet, even though piping or bore diameter as little as ⅛ inch is employed. The drip plugs in parallel substantially sustain the pressure applied at the source, each dripping at its predetermined slow rate.

It follows from the slow rate of propulsion of the oil through the piping system, due to the high flow resistance of the drip plugs, that the pipe line is nearly equipotential in pressure throughout its length during emission. With drip plugs of the specifications set forth or of equivalent specifications, the drip plugs are substantially determinative in themselves of the rate of emission therethrough, substantially regardless of the lengths of pipe intervening between them and the source of pressure. The resistance even of the coarsest drip plug set forth, which drips at rate faster than its companions is high relative to that of the longest pipe line intervening in a chassis lubricating system between the source of pressure and a drip plug. The pin-restricted bore has a higher resistance to flow than the combined resistance of the relief valve and the felt plug of the drip plug, so that variations in the strengths of valve springs and in the resistances of the felt plugs, do not markedly affect the rating, which is substantially determined by the pin-restricted bore or other resistance.

Thus, drip plugs of the required fixed ratings are applied at the bearings, the pipe lines are connected thereto by the couplings set forth and each bearing will receive its correct proportion of oil from the common supply piping. Changes in the viscosity of the oil, with an unchanged propelling pressure, will bring about changes in the absolute rate of emission of each drip plug, but the relative rates remain substantially constant, and, as noted, each bearing receives its correct proportion of oil.

The cavity within my drip plug is of small volume, of cross-section so small from end to end and so directly in the path of lubricant flow, that any air in the cavity will be readily pushed out through the outlet as lubricant is forced into the inlet of the drip plug. Flow control fittings with control parts necessitating large cavities or pockets are apt to trap air therein, which induces sluggishness and irregularities in emission. My drip plugs eliminate these objections and avoid the need for the cost and bulk of and the bother of manipulating special air bleeding appurtenances embodied therewith.

The T drip plug of Fig. 3 has a T stem substantially of the construction of the drip plug shown in Fig. 2. Corresponding parts are, accordingly, designated by the same reference numerals as in Fig. 2 but primed. The stem 10′ has a pipe thread 35 at its inlet end screwed into a corresponding socket 36 midway between the ends of the cross-arm piece 37. The extremity of the stem beyond the pipe thread 35 is reduced to provide for free flow of the lubricant through the socket 36 between the nipples 38 at the opposite ends of the T head. Segments of the supply pipe are connected to the nipples by couplings (not shown) similar to that shown in Fig. 2, and the ends of the nipples are tapered for this purpose, as shown at 40.

The drip plugs in parallel will sustain pressure applied at the source P, exceeding several times the seating pressure of each of the various drip plug valves. The pressure will rapidly build up throughout the oil-filled line, and the valves will crack open substantially concurrently regardless of manufacturing differences in the strengths of their seating springs, and in the lengths of pipe leading thereto. Each drip plug will emit according to its rating, its relative proportion of a charge equal to that admitted from the pump, the pressure being transmitted through an incompressible column of liquid filling the piping. When the pressure at the source ceases or is discontinued, the drip plug valves are promptly seated by their springs, and remain seated to maintain the pipe line filled with oil.

I claim:—

1. A drip plug for a pressure lubricating installation having a flow resistance so restricted as to permit seepage but prevent free flow from the fitting under working pressure, said fitting having a sealing part permitting the emission of lubricant when a predetermined pressure is exceeded and preventing reverse flow of air through the resistance, the cavity within said drip plug being so small in cross-section at all parts of the length thereof and so directly in the path of lubricant flow that any air will automatically be expelled as lubricant is forced into the fitting, and a strainer in the inlet end of said fitting having minute interstices capable of intercepting solid particles that might clog the resistance, the strainer presenting a substantial resistance to flow materially less than that incurred in said resistance.

2. A flow control fitting having an element subject to derangement by the lodging therein of solid particles entrained with the liquid medium, and a thick, soft and porous protective flow resistant strainer near the inlet end of said fitting, of texture sufficiently loose to permit said particles to become embedded at irregular depths therein, said fitting remaining nearly constant in its flow controlling characteristics whether said strainer be clear of, or largely filled with solid particles intercepted thereby.

3. A drip plug fitting including a flow controlling restriction therein so minute as to emit under substantial pressure, by seepage rather than free flow, an absorbent strainer plug lodged in a corresponding socket at the inlet end of said fitting said strainer plug having a backing screen of close metal mesh serving to prevent the entraining of loose fibres.

4. A drip plug comprising a fitting piece having therein a high flow resistance, substantially invariable in character, a felt strainer of small diameter within the inlet end of said fitting piece and of texture so dense as to protect said resistance from lodging thereat of solid particles that might clog the same and increase its resistance, said strainer impeding flow to a lesser degree than said resistance said drip plug having a rating designation corresponding to the rate imposed by the resistance.

5. A flow control fitting for application at the various branches of a central lubricating system, said fitting having a longitudinal highly restricted passageway therethrough, the wall of said passageway of rigid material, the dimensions of said passageway and its resistance to flow being substantially invariant, and substantially controlling of the rate of emission through the fitting said fitting having a relief valve at one end thereof urged closed by relatively weak spring pressure, said valve having a flat seating surface of yielding non-sticking material.

6. As an element in a lubricating installation, a pipe fitting having a nipple to be applied to a bearing, said element having a spring-seated non-sticking valve therein having a flat facing to prevent escape of oil from the fitting when less than a predetermined low pressure is applied thereto and a member nearly filling a part of the bore of said fitting to form a minute high resistance outlet in series with said valve and of resistance to flow higher than that due to said valve.

7. As an element in a lubricating installation, a pipe fitting having a nipple adapted to be applied to a bearing, a spring-seated valve in said fitting to prevent escape of oil therefrom and adapted to be closed when less than a predetermined low oil pressure in the order of fifteen pounds per square inch is applied thereto, said fitting including a resistance of flow retarding effect greater than that due to said valve, said resistance comprising a pin independent of said valve, within a portion of the bore of said fitting larger in diameter than said pin in the order of .001 to .007 inch.

8. A drip plug fitting comprising a short length of bored pipe fitting rod, a disk valve of nearly the external diameter of said rod lodged in a corresponding socket in one end of said fitting, a spring urging said valve against its seat, a protective strainer plug of fibrous material in a socket at the opposite end of said rod, and highly resistant flow controlling means inaccessibly confined within said fitting rod between said valve and said strainer.

9. A drip plug unit comprising a single metal fitting part having an end for application to a bearing, a relief valve lodged within a socket at said end and spring pressed to closing position, a strainer plug comprising a wad of felt lodged within a corresponding socket at the opposite end of said fitting, a flow controlling resistance in said fitting between said strainer and said valve of flow resistance greater than the combined resistance of the valve and the strainer, said fitting having means near its strainer end for application thereto of a feed pipe connection.

10. A set of drip plug pipe fittings with different ratings to suit the requirements of the different bearings of a central chassis lubricating installation, each fitting having means therein of invariant flow resisting effect equivalent to that imposed by a bore $\frac{1}{16}''$ in diameter nearly filled with a pin $\frac{1}{2}''$ in length, and depending on the rating, from .001 to .007'' smaller in diameter than the bore, each fitting having an exposed designation corresponding to its relative rating, whereby the drip plugs may be readily selected and installed on a chassis, each at a place corresponding to its rating designation, and each drip plug will without adjustment feed its correct proportion of lubricant regardless of the viscosity thereof from a common source.

11. The set of drip plug pipe fittings as claimed in claim 10, each member of which said set has a strainer lodged in a corresponding socket at the inlet end thereof offering a substantial flow resistance less than those of the invariant flow resisting means, and protecting the latter from the clogging effect due to solid particles entrained with the lubricant.

12. A drip plug terminal fitting having a housing composed of bar stock of diameter not much larger than the bearing hole at which it is to be applied, a small longitudinal bore in said housing for retaining a flow restriction, and a pair of larger bores in said housing, one containing a strainer and the other a relief valve.

13. A drip plug comprising a fitting having a solid walled flow restricting passage therethrough minute in cross-section, a relief valve lodged in a socket in one end of said fitting and normally pressed closed, and a dense strainer lodged in a socket in the other end of the fitting, said strainer offering a resistance to flow less than that offered by the flow restricting passage, said strainer and valve protecting the minute restriction at all times from the lodging thereat of solid particles said fitting of stock having a cross section little larger than that of the bearing hole to which it is applied.

14. A drip plug fitting having a longitudinal bore therein, a rigid pin loosely filling said bore, with a minute clearance offering a high resistance to flow, and a spring-seated relief valve in a corresponding socket at one end of said fitting, said relief valve serving to sustain the restriction pin from dropping out of place.

15. A drip plug fitting having a longitudinal bore therein, a rigid pin loosely filling said bore with a minute clearance offering a high resistance to flow, and a strainer plug fitting in a corresponding socket at the inlet end of said fitting, and serving also as a stop to prevent the restriction pin from dropping out of the fitting through the inlet end.

16. A drip plug having a longitudinal bore therein, a rigid pin loosely filling said bore with a minute clearance offering a high resistance to flow, a strainer plug in a corresponding socket at the inlet end of said fitting, a relief valve spring-seated in a corresponding socket at the other end of said fitting, said plug and valve also serving as stops to prevent the loose restriction pin from moving out of place.

17. A drip plug fitting comprising an elongated longitudinal bore of uniform diameter, and a rigid cylindrical pin nearly filling said bore and extending at opposite ends into enlarged cavities, and means beyond the restricted passageway determined by the pin, for maintaining the pin at all times within the entire length of said bore whereby the resistance to flow is not affected by burrs or other irregularities at the ends of the pin.

18. A drip plug terminal fitting having an annular metal seat in a socket at one end thereof, a rigid valve disk, a weak coil spring within said socket for seating said disk, said disk having a seating facing of material having the properties of oil-silk, of smoothness to seat completely under light pressure, softness to conform to the valve seat under seating pressure, being substantially impervious and chemically inert to oil and non-sticking.

19. A drip plug having an absorbent strainer at the inlet end thereof with the properties of wool felt, a relief valve at the outlet end thereof, said valve having a facing of soft material with the properties of oil silk, and a flow control resistance within said fitting between said strainer and said valve, said strainer and said valve facing being both of non-mineral character capable of withstanding the usual japan baking temperatures.

20. A drip plug subject to derangement by the lodging therein of solid particles entrained with the liquid medium, said drip plug having a protective porous strainer plug of small diameter fitted in a corresponding socket at the inlet end thereof and a perforated metal cup press-fitted within the outer end of the socket and preventing escape of the strainer therefrom, said retaining cup being so disposed as to afford a free passage for lubricant to the entire outer end surface of the strainer.

21. A set of outlet fittings of diverse fixed ratings for use in a pressure lubricating system, said fittings having means at an end for application thereof at the bearing and including coupling means at the opposite end for application thereto of the pipe extremity, each fitting having flow controlling means including a loosely fitting, substantially rigid part lodged with small substantially invariant clearance in a straight bore longitudinally of said fitting and affording, a crevice of uniform resistance all around it, the space left in said bore by said rigid part determining the selected calibration of the fitting, a valve seat in said fitting, said flow controlling means including a self-aligning valve part, and a coil spring normally urging said valve part against said seat, to hinder loss of lubricant.

22. A flow controlling terminal for a centralized distributing system having a rigid seat and a valve having a seating facing of oil-silk of smoothness to seat completely under light pressure, softness to conform to the valve seat under seating pressure, and being substantially impervious and chemically inert to oil and non-sticking, and resilient means urging said facing against said seat.

23. A flow controlling terminal fitting having an annular metal seat in a socket at one end thereof, a valve having a flat seating disk of oil silk, of smoothness to seat completely under light pressure, softness to conform to the valve seat under seating pressure, being substantially impervious and chemically inert to oil and non-sticking, a weak spring urging said valve against said seat, said valve freely disposed in a socket in the fitting, whereby the valve will be urged effectively against said seat under the pressure of the spring, substantially regardless of inaccuracies in the location of the seat within the fitting.

24. A drip plug comprising a pipe fitting piece having one end adapted to be applied at a bearing, and another end to protrude from the bearing and serving for application of a feed pipe thereto, said drip plug having a restriction passage therethrough of length considerably greater than its width, a valve lodged in a corresponding bore in and having a diameter which is a large fraction of that of said fitting piece, and spring means seating said valve and imposing a resistance to flow less than that due to the restriction, said valve having a yielding non-sticking seating facing.

25. A unitary self-contained drip plug comprising a pipe fitting piece having one end adapted to be applied at a bearing and another end to protrude from the bearing and serving for application of a feed pipe thereto, said piece having a cavity long relative to its width and a rigid member lodged with small clearance therein, and pressure responsive closures in said ends of said fitting piece, across the path of escape of said filler from said cavity, thereby establishing a permanent flow restricting crevice between the wall of the cavity and the filler.

26. A unitary self contained drip plug comprising a pipe fitting piece having one end adapted to be applied at a bearing and another end to protrude from the bearing and serving for application of a feed pipe thereto, said piece having a cavity long relative to its width, a rigid member circular in cross section lodged with small clearance therein, a pressure responsive closure in one end of said fitting piece, presenting resistance to flow less than that determined by the crevice between the cavity and the rigid member, said closure means including a coil spring resisting the displacement of said rigid member in oil propelling direction.

27. A unitary self contained drip plug comprising a pipe fitting piece having one end adapted to be applied at a bearing and another end to protrude from the bearing and serving for application of a feed pipe thereto, said piece having a bore long relative to its width, a rigid pin of slightly smaller diameter lodged therein, and liquid transmitting closure means in said fitting piece beyond said pin to confine said pin within said bore, thereby establishing a long flow restricting crevice between the bore and the pin.

28. A drip plug for effecting slow transmission of oil, said drip plug comprising a pipe fitting piece, having a strainer at the inlet end thereof, a flow restriction, and a valve, said fitting piece having the voids therein which are subjected to pressure nearly filled by said three elements, whereby in operation any air in the fitting or in the pipe line ahead of it will be automatically expelled therefrom.

29. A drip plug to permit seepage but prevent free flow under operating pressure, comprising a pipe fitting piece having an end serving for application of a feed pipe thereto and having flow instrumentalities therein, including a strainer at the inlet end of the drip plug and a flow restriction, said fitting piece having the voids therein which are subjected to pressure, of maximum cross section substantially that of the feed pipe, whereby in operation any air in the fitting or in the pipe line ahead of it will be automatically expelled therefrom.

Signed at New York city in the county of New York and State of New York this 30th day of July, A. D. 1926.

JOSEPH BIJUR.

CERTIFICATE OF CORRECTION.

Patent No. 1,632,772. Granted June 14, 1927, to

JOSEPH BIJUR.

It is hereby certified that error appears in the printed specification of the above numbered patent requiring correction as follows: Page 2, line 61, for the word "voids" read "avoids"; page 4, line 122, for the misspelled word "invarient" read "invariant"; page 5, line 59, for the word "or" read "of"; and that the said Letters Patent should be read with these corrections therein that the same may conform to the record of the case in the Patent Office.

Signed and sealed this 8th day of November, A. D. 1927.

Seal.

M. J. Moore,
Acting Commissioner of Patents.